(12) United States Patent  
Galassi

(10) Patent No.: US 8,715,134 B2
(45) Date of Patent: May 6, 2014

(54) STEPLESS GEAR RATIO VARIATOR

(75) Inventor: Lucia Galassi, Imola (IT)

(73) Assignee: Stefano Manara, Imola (BO) (IT)

( * ) Notice: Subject to any disclaimer, the term of this patent is extended or adjusted under 35 U.S.C. 154(b) by 78 days.

(21) Appl. No.: 13/392,932

(22) PCT Filed: Aug. 30, 2010

(86) PCT No.: PCT/IB2010/002127
§ 371 (c)(1),
(2), (4) Date: Feb. 28, 2012

(87) PCT Pub. No.: WO2011/027199
PCT Pub. Date: Mar. 10, 2011

(65) Prior Publication Data
US 2012/0157261 A1 Jun. 21, 2012

(30) Foreign Application Priority Data
Sep. 1, 2009 (IT) .............................. RA2009A0029

(51) Int. Cl.
*F16H 37/08* (2006.01)
(52) U.S. Cl.
USPC ............................................. 476/38; 476/36
(58) Field of Classification Search
USPC .................................. 476/36, 37, 38
See application file for complete search history.

(56) References Cited

U.S. PATENT DOCUMENTS

| 305,714 | A | * | 9/1884 | Schulze-Berge | 74/396 |
| 1,196,268 | A | * | 8/1916 | Noel | 464/157 |
| 2,397,003 | A | * | 3/1946 | Hambelton | 74/380 |
| 3,983,951 | A | * | 10/1976 | Guerra | 180/260 |
| 4,449,415 | A | * | 5/1984 | Groenhof | 476/7 |

FOREIGN PATENT DOCUMENTS

| EP | 1 026 424 A2 | | 8/2000 |
| EP | 1 253 350 A2 | | 10/2002 |
| JP | 2007-162925 | * | 6/2007 |
| WO | WO 2008/102167 A1 | | 8/2008 |

OTHER PUBLICATIONS

PCT International Search Report and Written Opinion dated Apr. 21, 2011.

* cited by examiner

*Primary Examiner* — William C Joyce
(74) *Attorney, Agent, or Firm* — Abelman, Frayne & Schwab

(57) ABSTRACT

A stepless gear ratio variator for wind generators wherein the transmission of motion between a driving member and a driven member takes place through friction of the respective convex contact surfaces translating simultaneously along respective incident axes of rotation; these surfaces being constrained, in use, to remain constantly in contact by means of a pair of support brackets mutually connected in an articulated manner by means of a pair of plates, pivoted to the same support brackets according to axes passing through the center of the contact surfaces of the driven and driving members.

5 Claims, 2 Drawing Sheets

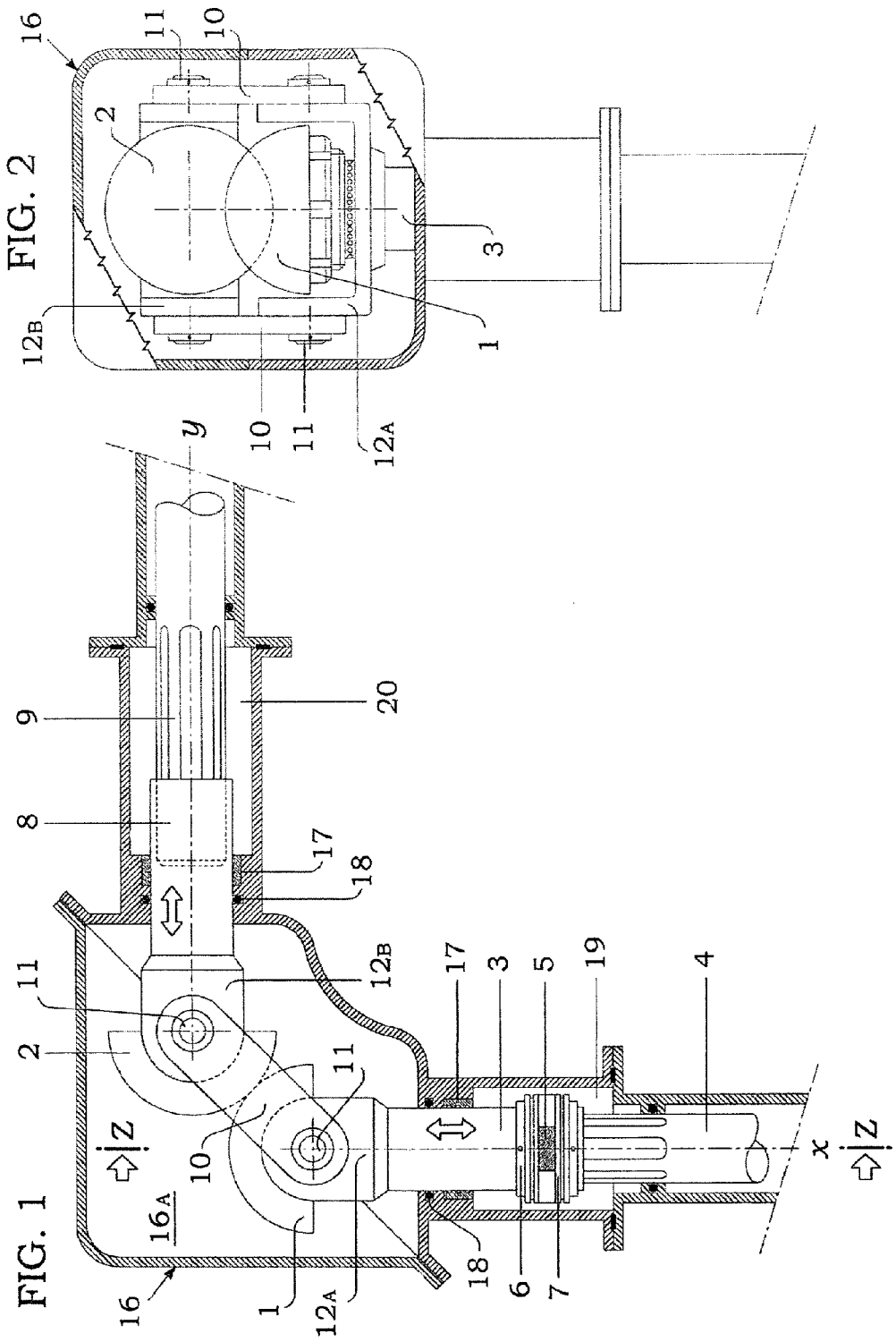

STEPLESS GEAR RATIO VARIATOR

CROSS REFERENCE TO RELATED APPLICATIONS

This application is a national phase of PCT application No. PCT/IB2010/002127, filed Aug. 30, 2010, which claims priority to IT patent application No. RA2009A000029, filed Sep. 1, 2009, all of which are incorporated herein by reference.

FIELD OF THE INVENTION

The present invention relates to a new system to obtain, in wind generators and in many other applications, variation of the gear ratio in a stepless manner through the relative displacement of half-balls in contact while the torques involved are transmitted through friction.

BACKGROUND OF THE INVENTION

Some examples of stepless gear ratio variators in which motion is transmitted by friction already exist in the market. Operation of said variators is obtained in two ways: either by increasing the number of members involved in the transfer of torque or by increasing the single surface in contact with respect to that guaranteed by punctiform contact.

However, said solutions are particularly complicated and bulky from a constructional point of view and also entail considerable production costs.

In a further solution of embodiment, transmission of motion between the driving member and the driven member takes place through the friction of a pair of elements with contact surfaces both convex or also only one convex and the other concave, preferably coated with suitable composite materials (ceramic or of other type) and translating simultaneously along the respective incident axes of rotation, in order to remain constantly in contact. Examples of this technical solution are described in the international patent application WO2008/102167 by the English company TOROTRAK DEV LTD or in the European patent application n. 1026424 by the Japanese company Isuzu Motors LTD. However, it should be noted that also the technical solutions described in these patent documents are somewhat complicated from the point of view of production, as in order to maintain the elements permanently in contact, it is necessary to act on both by means of a hydraulic pump which requires a specific circuit.

BRIEF SUMMARY OF THE INVENTION

Therefore, the object of the present invention is to offer a stepless gear ratio variator for the transmission of motion through friction which is easy to assemble and presents limited production and maintenance costs.

BRIEF DESCRIPTION OF THE DRAWINGS

Said variator is described below with reference to two drawings representing, purely by way of non-limiting example:

FIG. 1, which shows the sectional view of a stepless variator produced according to the invention and in which the driving element and the driven element have equal and hemispherical coupling surfaces;

FIG. 2, which shows a cutaway view referred to FIG. 1;

DETAILED DESCRIPTION OF THE INVENTION

Figure 3:
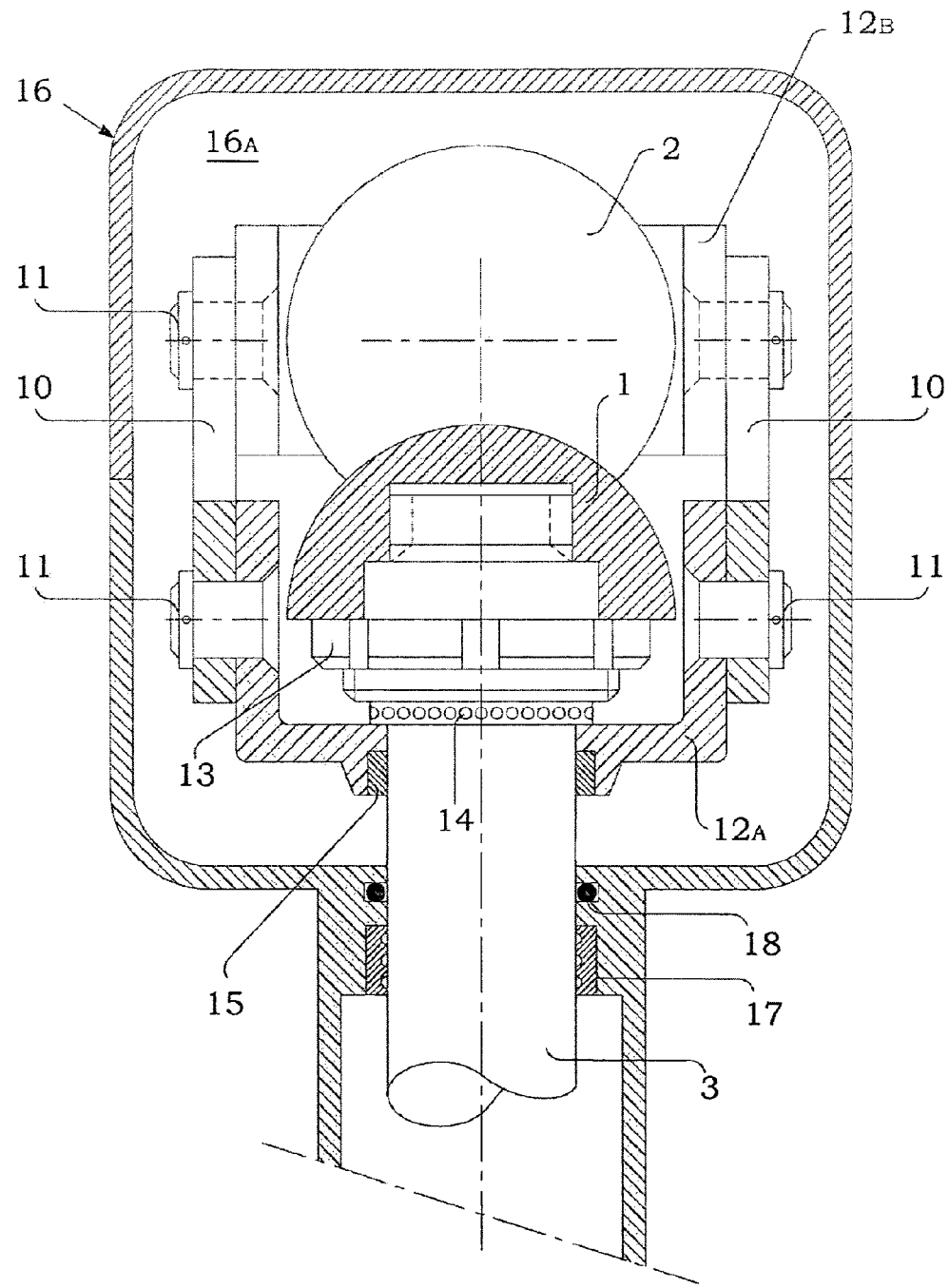
FIG. 3, which shows an enlargement of the section ZZ referred to FIG. 1.

From the accompanying drawings it can be seen that motion is transmitted from the drive shaft 4 to the driven shaft 9 through a pair of members 1 and 2 which, preferably constructed in steel, have curved coupling surfaces in order to obtain a variation of the gear ratio which is as smooth and large as possible.

In particular, the driving element 1, provided with rotational-translational motion along the axis X, is hemispherical and is coupled with the driven element 2, also hemispherical and with the same radius as that of the element 1, and provided with rotational-translational motion along the axis Y.

Said element 1 is integral with the hollow shaft 3 with respect to which it can be subject to brief regulating axial sliding movements.

Said shaft 3, through grooved coupling receives rotational motion from the drive shaft 4 on which it can slide longitudinally moved by an electric or hydraulic actuator to which it is connected by the bracket 5. This bracket is constrained to the hollow shaft 3 by two thrust elements 6 and by two needle cages 7, located at the two sides of the bracket to isolate it from the rotation imparted on the hollow shaft 3 by the drive shaft 4.

The driven element 2 is in turn integral with the hollow shaft 8 with respect to which it can be subject to brief regulating axial sliding movements.

Said hollow shaft 8, through grooved coupling transmits the rotational motion from the driven shaft 9, on which it can slide longitudinally when driven by the driving element 1 to which it is permanently constrained.

In fact, the two hemispherical transmission members 1 and 2 are maintained in direct contact with each other by a pair of plates 10, preferably pivoted in the point indicated with the reference number 11, on the outside of the same number of support brackets 12A and 12B and according to axes passing through the centre of the hemispherical portions 1 and 2.

The assembly of plates 10 and brackets 12, supported by the two shafts 3 and 8, ensures articulated connection of the same shafts, for the purpose of maintaining the two members 1 and 2 in constant contact, necessary for variation of the gear ratio through friction. Said transmission through friction is also ensured by an appropriate preload imparted, during mounting, to the same members 1 and 2 with a predetermined contact tension and necessary for correct operation of the assembly. Said preload is obtained by means of threaded ring nuts 13 screwed, with specific torque wrenches, onto the threaded portions specifically provided in each of the shafts 3 and 8 close to the elements 1 and 2.

Each of said shafts 3 and 8 is also provided with a ball cage 14 or other equivalent anti-friction element which, mounted inside the corresponding bracket 12A and 12B, isolates it from the rotation of the corresponding shaft, among other things provided, in correspondence of its bracket 12, with an appropriate bushing 15.

All this is mounted inside the chamber 16A of a box-shaped casing 16, in a traction fluid bath which, besides possessing the characteristics of normal lubricating fluids (lubricating capacity, anti-wear and heat dissipation), also has the special capacity of increasing its coefficient of friction if subjected to high pressures, thereby improving the mechanical efficiency of the transmission.

Also in the chambers 19 and 20 the shafts 3 and 8 are maintained in an oil bath and, notwithstanding the combined movements of rotation and linear translation of the aforesaid shafts, each supported by a bushing 17 with internal helical groove, appropriate gaskets 18 of known type prevent the passage of oil from the aforesaid chambers 19 and 20 to the chamber 16A where the transmission members 1 and 2 operate through friction immersed in the traction fluid described above.

Finally, without prejudice to the general characteristics of the variator illustrated and described, it could also be susceptible to modifications and variants, all however falling within the scope of the present patent.

The invention claimed is:

1. A stepless gear ratio variator for wind generators wherein the transmission of motion between a driving member and a driven member takes place through friction of the respective convex contact surfaces translating simultaneously along respective incident axes of rotation; said surfaces being constrained, in use, to remain constantly in contact; wherein said contact surfaces are constrained to remain permanently in contact by means of a pair of support brackets, and in that said support brackets are mutually connected in an articulated manner by means of a pair of plates, pivoted to said same support brackets according to axes passing through the centre of said contact surfaces of said driven and driving members;

wherein each of the two said members, responsible for the transmission of motion through friction, is integral with the end of a respective hollow shaft with respect to which it can be subjected to brief regulating axial sliding movements;

wherein said regulating axial sliding movements, necessary to ensure an appropriate preload of the two members during mounting, take place by means of threaded ring nuts screwed close to the elements to obtain the necessary contact tension for correct operation of the assembly.

2. A stepless variator as claimed in claim 1, wherein the contact surfaces of said driven and driving members are both hemispherical and of equal dimensions.

3. A stepless variator as claimed in claim 1, wherein transmission of motion through friction between said members takes place said members being immersed in a traction fluid which presents the capacity of increasing its coefficient of friction if subjected to high pressures, thereby improving the mechanical efficiency of the transmission.

4. A stepless variator as claimed in claim 1, wherein the two said hollow shafts are coupled respectively to the drive shaft and to the driven shaft, with respect to which said hollow shafts translate axially to vary the gear ratio.

5. A stepless variator as claimed in claim 4, wherein each of said hollow shafts is provided with a respective anti-friction element which is mounted inside the corresponding said support bracket to isolate it from the rotation of the corresponding shaft.

\* \* \* \* \*